United States Patent [19]

Chen

[11] Patent Number: 4,457,219
[45] Date of Patent: Jul. 3, 1984

[54] ANNULAR ROTATING ROASTER

[76] Inventor: Ming-Tang Chen, No. 14 Alley 89 La. 59 Nan Men Rd., Taichung, Taiwan

[21] Appl. No.: 421,076

[22] Filed: Sep. 22, 1982

[51] Int. Cl.³ .............................................. A47J 37/04
[52] U.S. Cl. ........................................ 99/449; 99/450; 126/25 AA; 126/338
[58] Field of Search .................. 99/448, 449, 450, 393, 99/401, 446, 421 P; 126/338, 25 AA

[56] References Cited

U.S. PATENT DOCUMENTS

| | | | |
|---|---|---|---|
| 674,991 | 5/1901 | Williams | 99/401 X |
| 996,082 | 6/1911 | Guissart et al. | 99/401 X |
| 2,819,667 | 1/1958 | Victor | 126/338 X |
| 2,894,448 | 7/1959 | Henderson et al. | 99/401 X |
| 3,040,651 | 6/1962 | Nolte, Jr. | 99/446 |
| 3,217,634 | 11/1965 | Fox | 99/446 X |
| 3,455,233 | 7/1969 | Cable | 99/446 X |
| 3,526,217 | 9/1970 | Garske | 126/25 A |

FOREIGN PATENT DOCUMENTS 52661  5/1910  Switzerland ................ 126/338

Primary Examiner—Billy J. Wilhite
Assistant Examiner—Christine A. Peterson
Attorney, Agent, or Firm—Holman and Stern

[57] ABSTRACT

This invention relates to an annular rotating roaster. The user may apply a cone-shaped flame separator which has numerous outstanding scales on its inner wall, when making a fire in the roaster. Each of the scales has a perforation beneath. The heat from the burning charcoal goes through the perforations and the scales to the meat. Thus, the meat won't be scorched. In addition, the degree of heat exposure is adjusted by the turning handle. Therefore, tender meat is produced. Moreover, the fat from the hot meat does not drop directly on the burning charcoal. As a result, no smoke or ashes rise, keeping the meat from being contaminated.

10 Claims, 2 Drawing Figures

ANNULAR ROTATING ROASTER

BACKGROUND OF THE INVENTION

This invention relates to portable charcoal roasters.

Roasting is a popular activity when picnicing and camping. Unfortunately, conventional roasting methods have many defects, including scorching of the meat and smoke and fire produced by melted meat fat dripping on the burning charcoal. According to medical reports, the eating of meat scorched (charcoaled) by direct exposure to fire and the inhalation of cooking smoke are detrimental to human health and may be carcinogenic.

SUMMARY OF THE INVENTION

This invention affords an annular rotating charcoal roaster, which may be assembled with a cone-shaped flame separator, that keeps the flame from direct contact with the meat and prevents the dripping of melted meat fat directly on the burning charcoal. The invention device is simple and inexpensive and easily adaptable to mass production.

The roaster is portable and easily disassembled so that it may be cleaned, stored, and the like. It is adapted to be placed directly upon the ground or other suitable place, and therefore has no sealed bottom. A conical smoke separator having inwardly bent scales is optionally provided. A rotating geared assembly is provided on the top of the roaster for transverse movement of the meat being roasted.

DETAILED DESCRIPTION OF THE INVENTION

Figure 1:
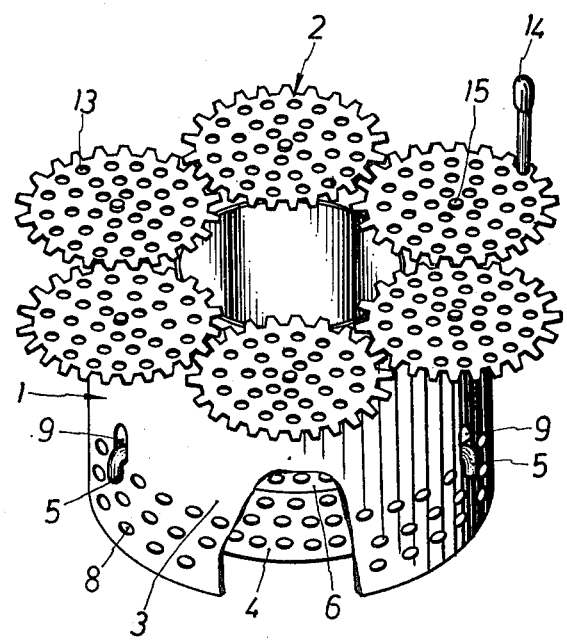
FIG. 1 is a perspective and partially cut away view of the invention.
Figure 2:
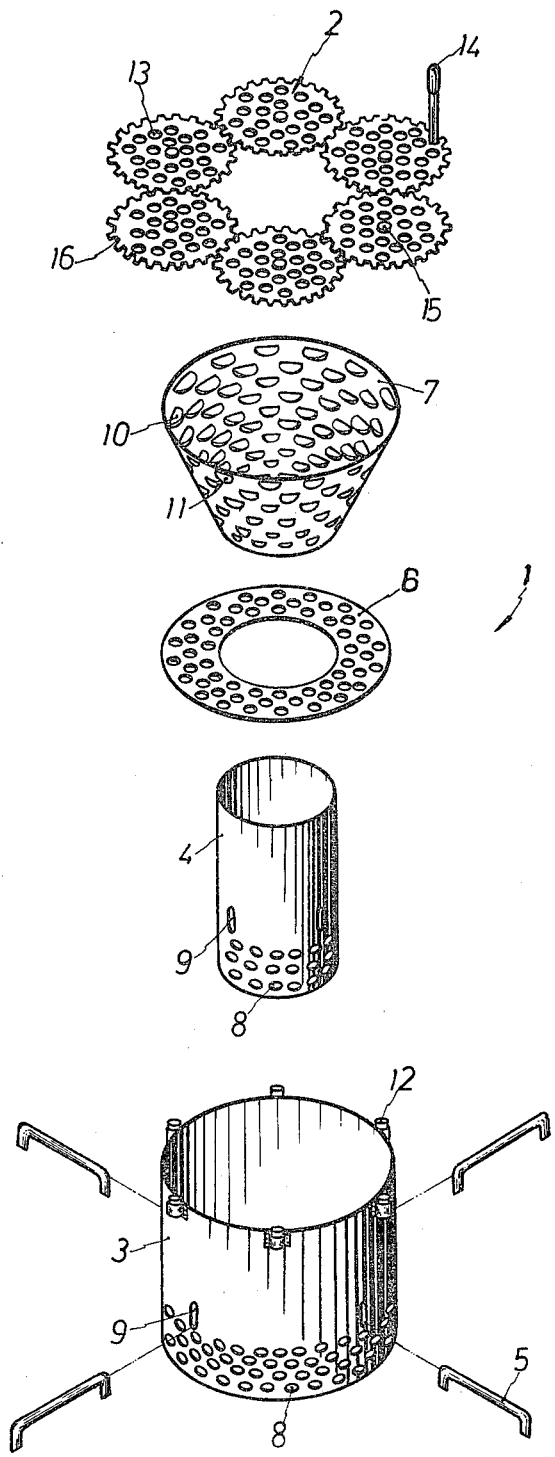
FIG. 2 is an exploded perspective view of the invention.

As shown in FIG. 1, the roaster comprises a body assembly 1 and a rotating geared assembly 2 removably mounted thereon. In FIG. 2, the body assembly 1 is clearly shown as comprising an outer roaster cylinder 3, an inner roaster cylinder 4 for concentric positioning within the outer roaster cylinder 3, and removable connecting rods 5 having a shallow inverted "U" configuration which connect and space apart the outer and inner cylinders. The connecting rods 5 pass through a plurality of apertures 9, in the outer cylinder 3 and inner cylinder 4, all such apertures being in about the same horizontal plane and in the depicted embodiment there are four connecting rods 5 spaced about 90° apart and in a generally radial direction to the notional central axis of the inner and outer roaster cylinders. As shown, the apertures 9 are all about the same width as the connecting rods 5 but are elongated vertically, so as to facilitate insertion, rotation, and removal of the rods. Both the outer cylinder 3 and the inner cylinder 4 have several horizontal rows of ventilating holes 8 on their lower portions, beneath the apertures 9. The outer cylinder 3 and inner cylinder 4 may each be made of appropriate metal plate formed into a cylinder with the sides joined by rivets or welding. A grate 6 rests horizontally upon the top of the connecting rods 5. The grate 6 substantially covers the space between the inner wall of the outer cylinder 3 and the outer wall of the inner cylinder 4 and therefore is a disc with a cut-out circle at its center. The grate 6 has a plurality of ventilating holes through its surface. A flame separator 7 comprising an inversely tapered frustoconical cylinder may be placed on top of the grate 6. The flame separator 7 has an upper opening corresponding to the inner width of the outer cylinder 3 and a smaller lower opening corresponding to the outer width of the inner cylinder 4, so that it will fit between these cylinders and between the grate 6 and the plates 13. The flame separator 7 has a plurality of semi-circular scales 10 bent upward and inward toward its center and formed from the wall of the cone itself, so that each scale 10 forms an inwardly projecting ledge having an opening 11 beneath it. This construction acts to prevent any direct contact between the flames and the meat, while permittng heated air from the flames to travel through the openings 11 and roast the meat. The rotating geared assembly 2 is removably mounted on the top of the outer cylinder 3. The rotating geared assembly 2 comprises a plurality of operatively associated circular plates 13 which are geared with one another by means of teeth 16 on their respective edges. Each plate 13 has a central mounting hole 15 and the outer cylinder 3 has a plurality of spaced fastening rods 12 corresponding to the number of plates 13, preferably made of tubular metal, vertically mounted on the outside of its upper portion and projecting above the top of the outer cylinder 3 itself. These fastening rods 12 provide axes for the plates 13 which are rotatably and removably mounted thereon through their central holes 15. A turning handle 14 is epicentrically provided on one of the plates 13, which handle may be an upwardly projecting rod. In the embodiment shown in the figures, the rotating assembly comprises six plates 13. However, as would be known to a mechanic of ordinary skill any reasonable number of plates can be afforded, provided that they are mounted in the same plane so that their teeth intermesh and act as gears and provided that they constitute an even number. The necessity for an even number of geared plates 13 is dictated by their forming a circular configuration so that each plate/gear 13 is operatively associated with the plate/gear on either side. The plates 13 may have a plurality of perforations or may comprise a metal mesh center.

In operation, the outer cylinder 3 and inner cylinder 4 are first connected by the connecting rods 5 passed through apertures 9. Then the grate 6 is placed between the cylinders so that it rests upon the connecting rods 5. After charcoal is placed between the cylinders and ignited, the flame separator 7 may be slid over the inner cylinder 4, if desired. The plates 13 are then placed on the fastening rods 12 so that they form an interlocking gear assembly 2 operable by movement of the turning handle 14. Meat or other food to be roasted is then placed across the top of the completed gear assembly 2, so that turning the handle 14 will create forward or reverse transverse horizontal movement of the food, the direction being dependent upon whether the handle 14 rotates the plate clockwise or counterclockwise.

I claim:

1. An annular roaster comprising:
   a vertical open outer cylinder having a plurality of spaced apertures lying in a horizontal plane through a lower portion of said outer cylinder, a plurality of ventilating holes below said apertures, and a plurality of spaced fastening rods vertically mounted on an upper portion of said outer cylinder and projecting above the plane of its top;

a smaller diameter equal length vertical open inner cylinder removably concentrically mounted within said outer cylinder having a plurality of corresponding apertures to those in said outer cylinder and lying in the same plane, and a plurality of ventilating holes below said apertures;

connecting means for removably connecting said outer cylinder and said inner cylinder comprising a plurality of connecting rods, each adapted to pass through an aperture in said outer cylinder and a corresponding aperture in said inner cylinder;

grate means comprising a perforated disc whose outer diameter is smaller than the inner diameter of said outer cylinder and having a circular cut-out center whose diameter is larger than that of said inner cylinder, said disc resting upon the plurality of said connecting rods, for spacing said cylinders from one another and affording a platform for burning fuel;

a plurality of circular perforated and toothed plates each having a central hole, corresponding in number to the number of said fastening rods and each one of said plates being concentrically removably mounted on each said fastening rod, said plates being of sufficient size so that the plurality of said plates forms an interlocking circular gear assembly; and turning handle means fastened to one of said plates, so that turning said one plate engages all of the remaining plates in said gear assembly.

2. The roaster of claim 1 wherein the ventilating holes in said outer and inner cylinders each form pluralities of notional rings of ventilating holes extending towards the bottoms of said cylinders.

3. The roaster of claim 1 wherein the connecting rods are shallow inverse "U" shaped rods.

4. The roaster of claim 3 wherein there are four corresponding apertures in each cylinder spaced about 90° apart and there are four corresponding connecting rods.

5. The roaster of claim 4 wherein there are six fastening rods and six corresponding perforated plates are removably mounted thereon.

6. The roaster of claim 5 further comprising:

flame separator means for preventing a direct flame from contacting food to be roasted placed upon said plates, comprising a perforated inversely tapered frustoconical cylinder whose smaller hole is larger in diameter than that of the inner cylinder and whose larger hole is smaller in diameter than that of the outer cylinder, which flame separator removably rests upon said grate and ends below the top of said outer cylinder.

7. The roaster of claim 10 wherein said flame separator has a plurality of semi-circular scales bent upward and inward toward its center, so that each scale forms an inwardly projecting ledge having an opening beneath it.

8. The roaster of claim 1 wherein there are six fastening rods and six corresponding perforated plates are removably mounted thereon.

9. The roaster of claim 1 further comprising:

flame separator means for preventing a direct flame from contacting food to be roasted placed upon said plates, comprising a perforated inversely tapered frustoconical cylinder whose smaller hole is larger in diameter than that of the inner cylinder and whose larger hole is smaller in diameter than that of the outer cylinder, which flame separator removably rests upon said grate and ends below the top of said outer cylinder.

10. The roaster of claim 9 wherein said flame separator has a plurality of semi-circular scales bent upward and inward toward its center, so that each scale forms an inwardly projecting ledge having an opening beneath it.

* * * * *